(12) United States Patent
Abe et al.

(10) Patent No.: US 8,304,654 B2
(45) Date of Patent: Nov. 6, 2012

(54) COAXIAL CABLE

(75) Inventors: Tomiya Abe, Hitachi (JP); Masanobu Ito, Hitachi (JP); Dai Ishikawa, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 390 days.

(21) Appl. No.: 12/641,974

(22) Filed: Dec. 18, 2009

(65) Prior Publication Data

US 2010/0170691 A1  Jul. 8, 2010

(30) Foreign Application Priority Data

Jan. 8, 2009  (JP) ................. 2009-002599

(51) Int. Cl.
*H01B 7/18*  (2006.01)
*H01B 9/02*  (2006.01)
*H01B 3/30*  (2006.01)
*H01B 3/44*  (2006.01)
*H01B 7/295*  (2006.01)

(52) U.S. Cl. .......... 174/102 R; 174/107; 174/110 R; 977/773; 977/777

(58) Field of Classification Search ........... 174/102 R, 174/107, 102 C, 110 R
See application file for complete search history.

(56) References Cited

U.S. PATENT DOCUMENTS 4,532,375 A * 7/1985 Weitzel et al. ............. 174/107
7,220,916 B2 * 5/2007 Schwamborn et al. ... 174/110 R
2005/0098344 A1 * 5/2005 Ysbrand ................. 174/102 SC

FOREIGN PATENT DOCUMENTS

| JP | 06-187847 | 7/1994 |
| JP | 07-018035 | 1/1995 |
| JP | 2006-294528 | 10/2006 |
| JP | 2007-084780 | 4/2007 |

OTHER PUBLICATIONS

Wakuda et al., Novel method for room temperature sintering of Ag nanoparticle paste in air, 2007, Chemical Physical Letters, 441, pp. 305-308.*

* cited by examiner

*Primary Examiner* — Jayprakash N Gandhi
*Assistant Examiner* — Dion Ferguson
(74) *Attorney, Agent, or Firm* — Scully, Scott, Murphy & Presser, P.C.

(57) ABSTRACT

A coaxial cable includes an electric conductor, an insulating layer formed on a periphery of the electric conductor, wherein the insulating layer includes an insulating material including a fluorine-containing polymer obtained by grafting at least one compound selected from unsaturated carboxylic acids and esters of the unsaturated carboxylic acids to a tetrafluoroethylene-perfluoroalkylvinylether copolymer, a conductive layer formed on a periphery of the insulating layer, wherein the conductive layer includes a sintered product from a metallic nanoparticle paste, and an outer insulating layer formed on a periphery of the conductive layer.

10 Claims, 2 Drawing Sheets

1 COAXIAL CABLE
2 ELECTRIC CONDUCTOR
3 INSULATING LAYER
4 CONDUCTIVE LAYER
5 OUTER INSULATING LAYER

20 COAXIAL CABLE
2 ELECTRIC CONDUCTOR
3a FIRST INSULATING LAYER
3b SECOND INSULATING LAYER
4 CONDUCTIVE LAYER
5 OUTER INSULATING LAYER

COAXIAL CABLE

The present application is based on Japanese patent application No. 2009-002599 filed on Jan. 8, 2009, the entire contents of which are incorporated herein by reference.

BACKGROUND OF THE INVENTION

1. Field of the Invention

This invention relates to a coaxial cable that includes an electric conductor, an insulating layer formed on a periphery of the electric conductor, and a conductive layer formed on a periphery of the insulating layer. In particular, this invention relates to a thin coaxial cable that uses a metallic nanoparticle paste as the conductive layer.

2. Description of the Related Art

As shown in FIG. 3, generally, a coaxial cable 30 includes a center conductor (electric conductor) 31, an insulating cover layer 32 (insulating layer) 32 formed on a periphery of the center conductor 31, and a shield layer (conductive layer) 33 formed as an outer conductor by winding a metallic wire or a metallic film around a periphery of the insulating layer 32, however, the method of forming the conductive layer 33 by the winding work has a problem that as a cable diameter becomes small, the fabrication becomes difficult.

Consequently, a method using a wet plating and a method using a conductive nanopaste that are superior to mass productivity even if the cable diameter is small, are proposed. For example, the former is disclosed in JP-1994(H06)-187847 and the latter is disclosed in JP-2006-294528.

The method using a conductive nanopaste is a method that forms the conductive layer on a periphery of a fluorine resin being a low dielectric resin by using a metallic nanopaste, and it can be described as an effective method for fabricating a thin coaxial cable.

However, the coaxial cable fabricated by the method using the conductive nanopaste has a problem that if a slight external deformation such as a bending occurs, an adhesion property between an insulating material forming the insulating layer and a metal thin film forming the conductive layer deteriorates so that the metal thin film are separated from the insulating material, and if the separation occurs, the film is broken, so that conduction of the external conductor becomes insufficient and a shield property is lowered. Also, in order to improve an adhesion property of the fluorine resin, a method using a chemical etching and a physical etching is known, however, it has a problem that process becomes complicated, cost of equipment becomes enlarged and waste liquid treatment becomes needed, so that mass productivity becomes insufficient.

SUMMARY OF THE INVENTION

Therefore, it is an object of the invention to provide a coaxial cable having a small diameter that has an enhanced adhesion property between an insulating layer and a conductive layer, and has an improved strength against bending deformation.

(1) According to one embodiment of the invention, a coaxial cable comprises:
an electric conductor;
an insulating layer formed on a periphery of the electric conductor, wherein the insulating layer comprises an insulating material comprising a fluorine-containing polymer obtained by grafting at least one compound selected from unsaturated carboxylic acids and esters of the unsaturated carboxylic acids to a tetrafluoroethylene-perfluoroalkylvinylether copolymer;
a conductive layer formed on a periphery of the insulating layer, wherein the conductive layer comprises a sintered product from a metallic nanoparticle paste; and
an outer insulating layer formed on a periphery of the conductive layer.

In the above embodiment (1), the following modifications and changes can be made.

(i) The metallic nanoparticle paste comprises metallic particles that comprise silver or copper particles of not more than 1 μm in average diameter.

(ii) The metallic nanoparticle paste comprises a protecting agent that comprises a reducing agent used at the sintering of the metallic nanoparticle paste, and that is capable of forming a chemical bonding with the fluorine-containing polymer.

(iii) The outer insulating layer comprises an insulating material that comprises a tetrafluoroethylene-perfluoroalkylvinylether copolymer.

(2) According to another embodiment of the invention, a coaxial cable comprises:
an electric conductor;
an insulating layer formed on a periphery of the electric conductor, wherein the insulating layer has a multilayer structure formed of not less than two layers, an innermost layer thereof comprises an insulating material comprising a tetrafluoroethylene-perfluoroalkylvinylether copolymer, and an outermost layer thereof comprises an insulating material comprising a fluorine-containing polymer obtained by grafting at least one compound selected from unsaturated carboxylic acids and esters of the unsaturated carboxylic acids to a tetrafluoroethylene-perfluoroalkylvinylether copolymer;
a conductive layer formed on a periphery of the insulating layer, wherein the conductive layer comprises a sintered product from a metallic nanoparticle paste; and
an outer insulating layer formed on a periphery of the conductive layer.

In the above embodiment (2), the following modifications and changes can be made.

(iv) The metallic nanoparticle paste comprises metallic particles that comprise silver or copper particles of not more than 1 μm in average diameter.

(v) The metallic nanoparticle paste comprises a protecting agent that comprises a reducing agent used at the sintering of the metallic nanoparticle paste, and that is capable of forming a chemical bonding with the fluorine-containing polymers.

(vi) The outer insulating layer comprises an insulating material that comprises a tetrafluoroethylene-perfluoroalkylvinylether copolymer.

ADVANTAGES OF THE INVENTION

According to one embodiment of the invention, a coaxial cable comprising a conductive layer fowled of a metallic nanoparticle paste that has both of an enhanced adhesion property between an insulating layer and a conductive layer, and an improved strength against bending deformation, even if it has a small diameter, can be provided.

In addition, according to one embodiment of the invention, a coaxial cable comprising a conductive layer formed of a metallic nanoparticle paste that is capable of satisfying both of the easy peeling property between the electric conductor and the insulating layer and the adhesion property between the insulating layer and the conductive layer, even if it has a small diameter, can be provided.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
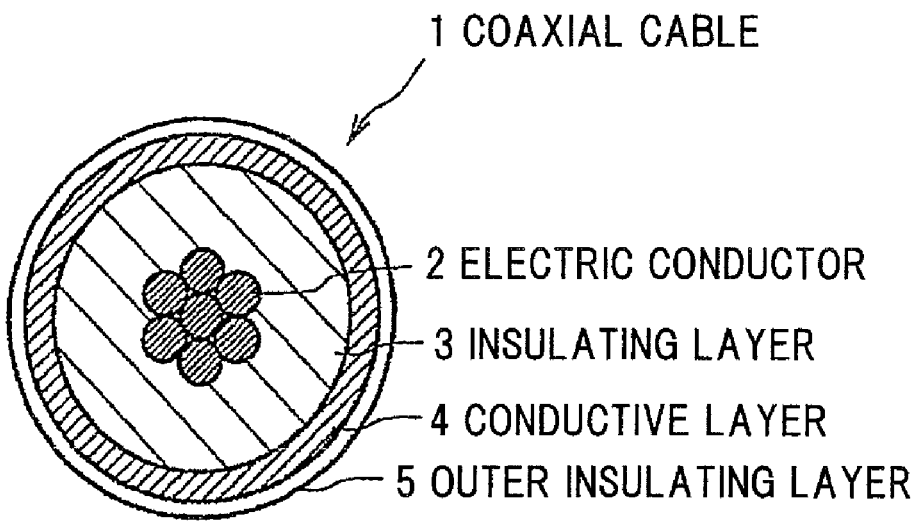
FIG. 1 is a transverse cross-sectional view schematically showing a coaxial cable in a first preferable embodiment of the invention.

The preferred embodiments according to the invention will be explained below referring to the drawings.

Conventionally, as means to enhance an adhesion property between a metal or the like and a fluorine resin, it is known that the fluorine resin is modified, and methods of introducing various functional groups into the fluorine resin are proposed. This technique is disclosed in, for example, JP-2007-84780 and JP-1995(H07)-18035.

However, if the modified fluorine resin is used as an insulating material forming the insulating layer of the coaxial cable, the easy peeling property between the insulating layer and the electric conductor (center conductor) becomes insufficient. Consequently, it has been thought that the modified fluorine resin is unsuitable for a coaxial cable having an insulating layer that is needed to be separated for terminal treatment.

Therefore, usually, a general-purpose fluorine resin has been used. Similarly, a usual coaxial cable having an conductive layer (shield layer) formed of metal wires is not needed to have an adhesion property between the metal wires and the insulating layer, so that the general-purpose fluorine resin has been used. Namely, in the usual coaxial cable, the modified fluorine resin has not been used.

In the above-mentioned situation, the inventors have studied and obtained an idea that a coaxial cable having the conductive layer formed of a sintered product from a conductive nanopaste is needed to have the adhesion property for preventing the conductive layer and the insulating layer from being separated, so that large advantage may be obtained if the modified fluorine resin is used, and they have achieved the invention.

First Embodiment

FIG. 1 is a transverse cross-sectional view schematically showing a coaxial cable in the first embodiment of the invention.

As shown in FIG. 1, a coaxial cable 1 of the first embodiment of the invention includes an electric conductor 2 such as stranded wires formed of a plurality of copper alloy wires, an insulating layer 3 formed on a periphery of the electric conductor 2, a conductive layer 4 formed on a periphery of the insulating layer 3 and an outer insulating layer 5 formed on a periphery of the conductive layer 4.

As an insulating material forming the insulating layer 3, fluorine-containing polymers are used, the polymers being obtained by that at least one compound selected from the group consisting of unsaturated carboxylic acids and esters of the unsaturated carboxylic acids is grafted to tetrafluoroethylene-perfluoroalkylvinylether copolymers The fluorine-containing polymers have a large characteristic that they have a good adhesion property to the other polymers, metals or the like in comparison with usual tetrafluoroethylene-perfluoroalkylvinylether copolymers.

The conductive layer 4 includes a conductive thin film formed of a sintered product from a metallic nanoparticle paste. As the metallic nanoparticle paste, conductive fine particles having conductivity such as silver or copper particles of not more than 1 μm in average diameter are preferably used.

The reason why the average diameter is set to not more than 1 μm is that if a coating material containing conductive fine particles of more than 1 μm in the average diameter is used, it leads to a result that solids of more than 1 μm exist in a coated film of almost 5 μm in thickness, so that concavity and convexity, and unevenness are likely to occur in the coated film during the coating process, and it is difficult to form a good conductive thin film.

In addition, generally, fine particles have active surfaces so that they easily form aggregates. Since the aggregates lager than 1 μm cause concavity and convexity, and unevenness in the coated film during the coating process, it is needed to inhibit them from being formed. Consequently, as the fine particles, fine particles that have an appropriate organic aggregation inhibiting layer such as a surfactant can be preferably used.

Further, as the protecting agent of the metallic nanoparticle paste, a protecting agent that includes a reducing agent used at the sintering of the metallic nanoparticle paste, and that is capable of forming a chemical bonding with the fluorine-containing polymers such as dodecylamine can be preferably used.

As the insulating material informing the insulating layer, tetrafluoroethylene-perfluoroalkylvinylether copolymers can be preferably used from the point of view of properties such as peeling property, low-dielectric property and formability.

According to the coaxial cable 1 having the above-mentioned structure, as the insulating material forming the insulating layer 3, the fluorine-containing polymers are used, the fluorine-containing polymers being obtained by that at least one compound selected from the group consisting of unsaturated carboxylic acids and esters of the unsaturated carboxylic acids is grafted to tetrafluoroethylene-perfluoroalkylvinylether copolymers, so that the adhesion property between the conductive layer 4 formed of a sintered product from a metallic nanoparticle paste and the insulating layer 3 can be enhanced, and the strength against bending deformation can be improved.

Also, according to the coaxial cable 1, metallic particles of the metallic nanoparticle paste are silver or copper particles of not more than 1 μm in average diameter, so that a good conductive thin film can be formed and a stable shield property can be obtained without generating concavity and convexity, and unevenness in the coated film during the coating process.

Further, according to the coaxial cable 1, the protecting agent of the metallic nanoparticle paste comprises a reducing agent used at the sintering of the metallic nanoparticle paste, and the protecting agent is capable of forming a chemical bonding with the fluorine-containing polymers, so that the protecting agent forms a chemical bonding with the fluorine-containing polymers of the insulating layer 3, and the adhesion property between the insulating layer 3 and the conductive layer 4 can be further enhanced.

Furthermore, according to the coaxial cable 1, as the insulating material forming the outer insulating layer 5, tetrafluoroethylene-perfluoroalkylvinylether copolymers are used, so that properties such as peeling property, low-dielectric property and formability can be satisfied.

In the coaxial cable 1, the adhesion property between not only the insulating layer 3 and the conductive layer 4, but also the electric conductor 2 and the insulating layer 3 is enhanced, consequently, the easy peeling property at the time of separating the insulating layer 3 from the electric conductor 2 for the terminal treatment is somewhat sacrificed, but it can be described that the effects due to the enhancement in stability of the shield property and the improvement in strength against the bending deformation are more advantageous to the coaxial cable 1.

Second Embodiment

Hereinafter, a second preferred embodiment according to the invention will be explained.

Figure 2:
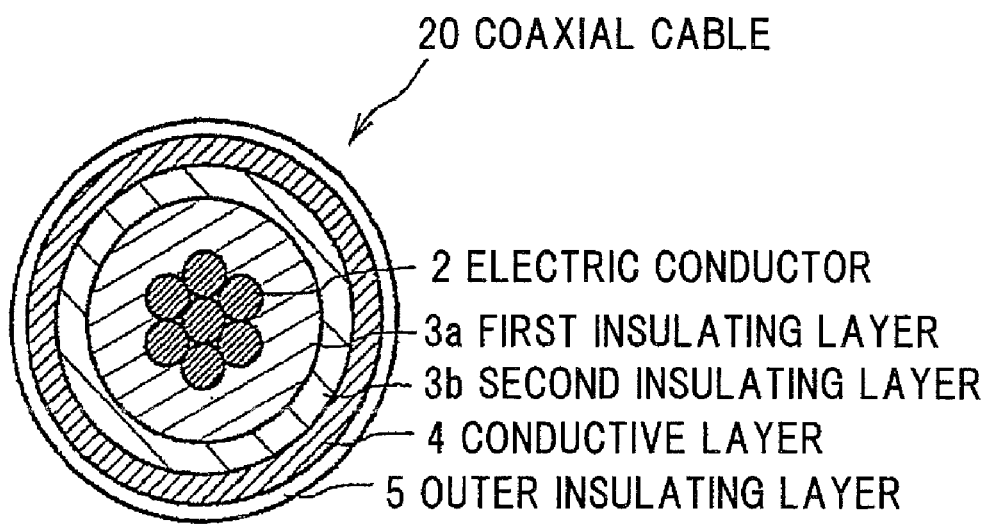
FIG. 2 is a transverse cross-sectional view schematically showing a coaxial cable in a second embodiment of the invention.

FIG. 2 is a transverse cross-sectional view schematically showing a coaxial cable in the second embodiment of the invention.

An coaxial cable 20 in the second embodiment is different from the coaxial cable 1 shown in FIG. 1 in that the coaxial cable 20 has a two-layered structure comprising a first insulating layer 3a and a second insulating layer 3b.

As the first insulating layer 3a, tetrafluoroethylene-perfluoroalkylvinylether copolymers are preferably used, and as the second insulating layer 3b, fluorine-containing polymers obtained by that at least one compound selected from the group consisting of unsaturated carboxylic acids and esters of the unsaturated carboxylic acids is grafted to tetrafluoroethylene-perfluoroalkylvinylether copolymers are used.

Hereinafter, functions of the coaxial cable 20 will be explained.

In the coaxial cable 1, adhesion property between the insulating layer 3 and the conductive layer 4 can be enhanced, but adhesion property between the electric conductor 2 and the insulating layer 3 is simultaneously enhanced, consequently, the easy peeling property at the time of separating the insulating layer 3 from the electric conductor 2 for the terminal treatment is somewhat sacrificed.

On the other hand, in the coaxial cable 20, as the insulating material forming the first insulating layer 3a directly contacting with the electric conductor 2, tetrafluoroethylene-perfluoroalkylvinylether copolymers are used, so that the easy peeling property between the electric conductor 2 and the first insulating layer 3a cable 1 can be obtained just as obtained in the case of the conventional coaxial 1.

Further, as the insulating material forming the second insulating layer 3b directly contacting with the conductive layer 4, fluorine-containing polymers obtained by that at least one compound selected from the group consisting of unsaturated carboxylic acids and esters of the unsaturated carboxylic acids is grafted to tetrafluoroethylene-perfluoroalkylvinylether copolymers are used, so that adhesion property between the insulating layer 3 and the conductive layer 4 can be enhanced in comparison with the conventional coaxial cable.

Namely, the coaxial cable 20 has the two-layered structure comprising the first insulating layer 3a and the second insulating layer 3b instead of the insulating layer 3, so that it can satisfy both of the easy peeling property between the electric conductor 2 and the insulating layer 3 and the adhesion property between the insulating layer 3 and the conductive layer 4.

In the embodiment, a case that the insulating layer 3 has the two-layered structure has been explained, but not limited to this, a multilayer structure can be also used. In this case, as an insulating material forming the innermost layer thereof, tetrafluoroethylene-perfluoroalkylvinylether copolymers can be preferably used, and as an insulating material forming the outermost layer thereof, fluorine-containing polymers obtained by that at least one compound selected from the group consisting of unsaturated carboxylic acids and esters of the unsaturated carboxylic acids is grafted to tetrafluoroethylene-perfluoroalkylvinylether copolymers can be preferably used.

The coaxial cables 1, 20 in the embodiments of the invention described above are superior to mass productivity and can sufficiently deal with a smaller diameter, so that they are industrially useful.

EXAMPLES

Fluorine-containing polymers being obtained by that carboxylic anhydride is grafted to tetrafluoroethylene-perfluoroalkylvinylether copolymers were used. The fluorine-containing polymers are referred to as "grafted PFA".

Further, as tetrafluoroethylene-perfluoroalkylvinylether copolymers, "Fluon" (registered trademark) P-62XPT manufactured by Asahi Glass Co., Ltd. was used. The polymer is referred to as "PFA".

Example 1

The coaxial cable 1 according to the invention shown in FIG. 1 was fabricated in accordance with the following procedure.

First, the grafted PFA was extruded by a melt extruder at a resin temperature of 350 degrees C. on a periphery of the electric conductor 2 of 0.048 mm in diameter being obtained by twisting seven copper alloy wires of 16 μm in diameter, so as to form the insulating layer 3 of 60 μm in thickness.

Next, a silver nanoparticle paste of 10 nm in average particle diameter containing dodecylamine as a reducing agent (a protecting agent) was coated on a periphery of the insulating layer 3 by using a coating die, and was heat-treated and sintered at 290 degrees C. for 10 seconds, so as to form the conductive layer (shield layer) 4 of 7 μm in thickness.

Next, the PFA was coated on the conductive layer 4 at a resin temperature of 350 degrees C. by a melt extruder, so as to form the outer insulating layer 5 of 20 μm in thickness, and fabricate the coaxial cable 1.

After the coaxial cable 1 was wound by 10 turns at R10 and used, it still kept a function of an exterior shield and had good electric properties.

Example 2

The coaxial cable 20 according to the invention shown in FIG. 2 was fabricated in accordance with the following procedure.

First, the PFA was extruded by a melt extruder at a resin temperature of 350 degrees C. on a periphery of the electric conductor 2 of 0.048 mm in diameter being obtained by twisting seven copper alloy wires of 16 μm in diameter, so as to form the first insulating layer 3a of 30 μm in thickness. In addition, the grafted PFA was extruded by a melt extruder at a resin temperature of 350 degrees C. on a periphery of the first insulating layer 3a, so as to form the second insulating layer 3b of 30 μm in thickness.

Next, a silver nanoparticle paste of 10 nm in average particle diameter containing dodecylamine as a reducing agent (a protecting agent) was coated on a periphery of the second insulating layer 3b by using a coating die, and was heat-treated and sintered at 290 degrees C. for 10 seconds, so as to form the conductive layer (shield layer) 4 of 7 μm in thickness.

Next, the PFA was coated on the conductive layer 4 at a resin temperature of 350 degrees C. by a melt extruder, so as to form the outer insulating layer 5 of 20 μm in thickness, and fabricate the coaxial cable 20.

After the coaxial cable 20 was wound by 10 turns at R10 and used, it still kept a function of an exterior shield and had good electric properties.

Comparative Example 1

First, the PFA was extruded by a melt extruder at a resin temperature of 350 degrees C. on a periphery of the electric conductor of 0.048 mm in diameter being obtained by twisting seven copper alloy wires of 16 μm in diameter, so as to form the insulating layer of 60 μm in thickness.

Next, a silver nanoparticle paste of 10 nm in average particle diameter containing dodecylamine as a reducing agent (a protecting agent) was coated on a periphery of the insulating layer by using a coating die, and was heat-treated and sintered at 290 degrees C. for 10 seconds, so as to form the conductive layer (shield layer) of 7 μm in thickness.

Next, the PFA was coated on the conductive layer at a resin temperature of 350 degrees C. by a melt extruder, so as to form the outer insulating layer of 20 μm in thickness, and fabricate the coaxial cable.

After the coaxial cable was wound by 10 turns at R10 and used, cracks occurred in the conductive layer, an electric conduction became poor and the shield property could not be maintained.

Comparative Example 2

Figure 3:
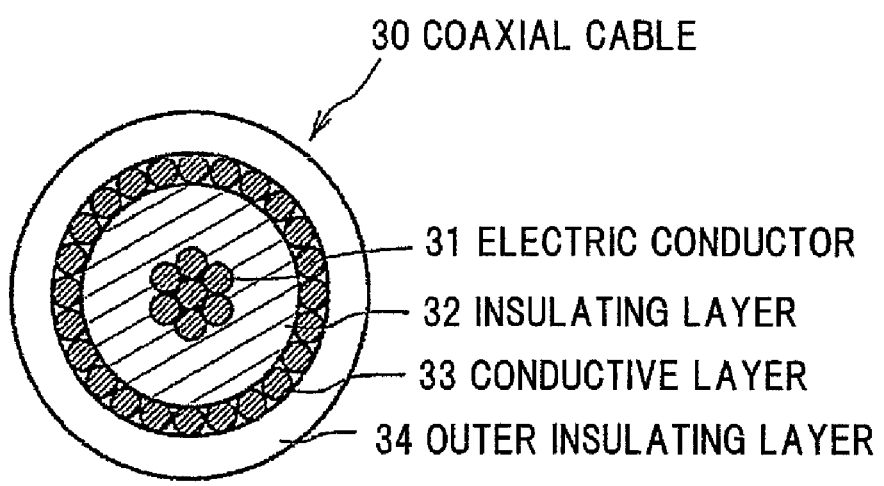
FIG. 3 is a transverse cross-sectional view schematically showing a conventional coaxial cable.

A conventional coaxial cable 30 shown in FIG. 3 was fabricated in accordance with the following procedure.

First, the PFA was extruded by a melt extruder at a resin temperature of 350 degrees C. on a periphery of the electric conductor 31 of 0.048 mm in diameter being obtained by twisting seven copper alloy wires of 16 μm in diameter, so as to form the insulating layer 32 of 60 μm in thickness.

Next, copper alloy wires of 16 μm in diameter were densely wound (laterally wound), so as to form a conductive layer (shield layer) 33.

Next, the PFA was coated on the conductive layer 33 at a resin temperature of 350 degrees C. by a melt extruder, so as to form the outer insulating layer 34 of 20 μm in thickness, and fabricate the coaxial cable 30.

The lateral winding process of the coaxial cable 30 needed a great deal of labor and time.

From the above-mentioned Examples and Comparative Examples, it is understood that according to the coaxial cables 1, 20 of the invention, adhesion property between the insulating layer 3 and the conductive layer 4 can be enhanced and strength against bending deformation can be improved.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A coaxial cable, comprising:
    an electric conductor;
    an insulating layer formed on a periphery of the electric conductor, wherein the insulating layer comprises an insulating material comprising a fluorine-containing polymer obtained by grafting at least one compound selected from unsaturated carboxylic acids and esters of the unsaturated carboxylic acids to a tetrafluoroethylene-perfluoroalkylvinylether copolymer;
    a conductive layer formed on a periphery of the insulating layer, wherein the conductive layer comprises a sintered product from a metallic nanoparticle paste, said metallic nanoparticle paste comprising a protecting agent that forms a chemical bond with the insulating layer of the fluorine-containing polymer; and
    an outer insulating layer formed on a periphery of the conductive layer.

2. The coaxial cable according to claim 1, wherein the metallic nanoparticle paste comprises metallic particles that comprise silver or copper particles of not more than 1 μm in average diameter.

3. The coaxial cable according to claim 1, wherein the protecting agent comprises a reducing agent used at the sintering of the metallic nanoparticle paste.

4. The coaxial cable according to claim 1, wherein the outer insulating layer comprises an insulating material that comprises a tetrafluoroethylene-perfluoroalkylvinylether copolymer.

5. A coaxial cable, comprising:
    an electric conductor;
    an insulating layer formed on a periphery of the electric conductor, wherein the insulating layer has a multilayer structure formed of not less than two layers, an innermost layer thereof comprises an insulating material comprising a tetrafluoroethylene-perfluoroalkylvinylether copolymer, and an outermost layer thereof comprises an insulating material comprising a fluorine-containing polymer obtained by grafting at least one compound selected from unsaturated carboxylic acids and esters of the unsaturated carboxylic acids to a tetrafluoroethylene-perfluoroalkylvinylether copolymer;
    a conductive layer formed on a periphery of the insulating layer, wherein the conductive layer comprises a sintered product from a metallic nanoparticle paste, said metallic nanoparticle paste comprising a protecting agent that forms a chemical bond with the insulating layer of the fluorine-containing polymer; and
    an outer insulating layer formed on a periphery of the conductive layer.

6. The coaxial cable according to claim 5, wherein the metallic nanoparticle paste comprises metallic particles that comprise silver or copper particles of not more than 1 μm in average diameter.

7. The coaxial cable according to claim 5, wherein the protecting agent comprises a reducing agent used at the sintering of the metallic nanoparticle paste.

8. The coaxial cable according to claim 5, wherein the outer insulating layer comprises an insulating material that comprises a tetrafluoroethylene-perfluoroalkylvinylether copolymer.

9. The coaxial cable of claim 1, wherein the protecting agent comprises dodecylamine.

10. The coaxial cable of claim 5, wherein the protecting agent comprises dodecylamine.

* * * * *